(12) United States Patent
Huang et al.

(10) Patent No.: US 11,972,720 B2
(45) Date of Patent: Apr. 30, 2024

(54) METHOD FOR MATCHING PARAMETERS APPLIED TO DISPLAY DEVICE, AND CIRCUIT SYSTEM

(71) Applicant: REALTEK SEMICONDUCTOR CORP., Hsinchu (TW)

(72) Inventors: Yueh-Hsing Huang, Hsinchu (TW); Sen-Huang Tang, Hsinchu (TW); Wu-Chih Lin, Hsinchu (TW); Yen-Hsing Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 72 days.

(21) Appl. No.: 17/736,196

(22) Filed: May 4, 2022

(65) Prior Publication Data
US 2022/0358874 A1 Nov. 10, 2022

(30) Foreign Application Priority Data

May 6, 2021 (TW) ................................. 110116448

(51) Int. Cl.
*G09G 3/20* (2006.01)
*H04N 7/01* (2006.01)

(52) U.S. Cl.
CPC .............. *G09G 3/2096* (2013.01); *H04N 7/01* (2013.01); *G09G 2320/06* (2013.01); *G09G 2320/08* (2013.01)

(58) Field of Classification Search
CPC ............. G09G 3/2096; G09G 2320/06; G09G 2320/08; G09G 2340/0407; G09G 2340/0435; G09G 2370/042; G09G 5/005; H04N 7/01; G06F 3/13
See application file for complete search history.

(56) References Cited

U.S. PATENT DOCUMENTS

| 11,183,146 | B1* | 11/2021 | Zhou ........................ G09G 5/06 |
| 2005/0007395 | A1* | 1/2005 | Tan ......................... G09G 5/006 345/698 |
| 2005/0140698 | A1* | 6/2005 | Tseng ..................... G09G 5/005 345/661 |

(Continued)

FOREIGN PATENT DOCUMENTS

| CN | 101521001 A | 9/2009 |
| CN | 107786864 A | 3/2018 |

*Primary Examiner* — Dmitriy Bolotin
(74) *Attorney, Agent, or Firm* — Li & Cai Intellectual Property (USA) Office

(57) ABSTRACT

A method for matching parameters applied to a display device and a circuit system that performs the method are provided. In the method, when a display device is activated, a circuit system connects to a panel module of the display device for retrieving parameters from a panel memory. The parameters are such as video display parameters, camera image parameters, speaker audio parameters, and microphone receiving parameters. After the parameters are applied to the circuit system, the circuit system operates the display device using the parameters. The data generated by the circuit system can be adjusted for matching new parameters. Afterwards, when the new parameters are applied to the circuit system, video and audio are outputted according to the matched parameters, and the camera and microphone in the panel module are also operated according to the matched parameters.

20 Claims, 5 Drawing Sheets

(56) References Cited

U.S. PATENT DOCUMENTS

| | | | |
|---|---|---|---|
| 2005/0248657 A1* | 11/2005 | Hsiao | H04N 1/00307 |
| | | | 348/207.1 |
| 2006/0044295 A1* | 3/2006 | Yu | G09G 3/2096 |
| | | | 345/204 |
| 2008/0143694 A1* | 6/2008 | Tu | G09G 3/2096 |
| | | | 345/204 |
| 2009/0027327 A1* | 1/2009 | Urisu | G09G 3/3611 |
| | | | 345/101 |
| 2009/0237337 A1* | 9/2009 | Nomizo | G09G 3/2096 |
| | | | 345/92 |
| 2011/0096080 A1* | 4/2011 | Huang | G09G 3/2096 |
| | | | 345/520 |
| 2019/0057639 A1* | 2/2019 | Lai | G09G 3/2003 |
| 2019/0182509 A1* | 6/2019 | Kim | H04N 19/80 |

* cited by examiner

METHOD FOR MATCHING PARAMETERS APPLIED TO DISPLAY DEVICE, AND CIRCUIT SYSTEM

CROSS-REFERENCE TO RELATED PATENT APPLICATION

This application claims the benefit of priority to Taiwan Patent Application No. 110116448, filed on May 6, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for matching parameters applied to a display device, and more particularly to a method and a system for generating re-matched parameters when a circuit system of the display device matches the panel-related parameters read from a memory.

BACKGROUND OF THE DISCLOSURE

For an integrated circuit (IC) design company, not only does a great deal of time need to be invested in designing of a chip for a product, chip parameters for operating the product also need to be developed according to attributes of the product. However, the chip may not be suitable for all products since every product has its unique attributes and specifications even if the products belong to the same category. Accordingly, the IC design company needs to supply and develop different chips for different products.

Taking a television as an example, a television manufacturer provides different series of products for different types of customers. For example, different series of televisions may have different screen sizes, different display capabilities, different specifications of panels, and even be equipped with different attachments. Certain series of televisions may include a camera, a microphone and a speaker, while other series of televisions may not have these attachments or only have one of the attachments. The different series of televisions may require different TV chips to fit their individual needs, so that the chips have to be re-designed to meet different needs.

SUMMARY OF THE DISCLOSURE

The present disclosure provides a method for matching parameters applied to a display device and a circuit system. The circuit system introduces a parameter matching mechanism for improving a progress of developing a control chip of a display device (e.g., a television) and effectively shortening the time spent on development.

The circuit system implements the method for matching parameters applied to a display device. In an aspect of the present disclosure, a display device is activated and the circuit system of the display device firstly connects to a panel module of the display device. Besides the display panel, the panel module also includes other attachments such as a speaker, a camera, and a microphone. The display panel and the attachments have different specifications with respect to various product series.

Next, the circuit system of the display device reads parameters for operating the display panel and the attachments from a panel memory, and the parameters are then applied to the circuit system. The circuit system relies on the parameters to operate the display device. Afterwards, the circuit system can adjust the data being generated from operating the display device, and generate the matched parameters for the display device.

Preferably, the circuit system reads parameters from the panel memory, and the parameters include one or any combination of video display parameters, camera image parameters, speaker audio parameters, and microphone receiving parameters.

The video display parameters include one or any combination of display size, resolution, refresh rate, maximum screen brightness, screen saturation and color parameters, screen gamma curve, screen delay, maximum screen supported frequency, high dynamic range, color gamut, maximum chroma, and number of local dimming regions.

Further, the camera image parameters include at least one of camera pixels, compression ratio, and refresh rate. The microphone receiving parameters include at least one of microphone quantity, directivity, noise reduction setting, and dynamic range.

Therefore, when the matched parameters are applied to the circuit system, at least one of an adjusted video, a camera image, and an audio are produced, and/or matched audio-receiving parameters are applied to receive the audio.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
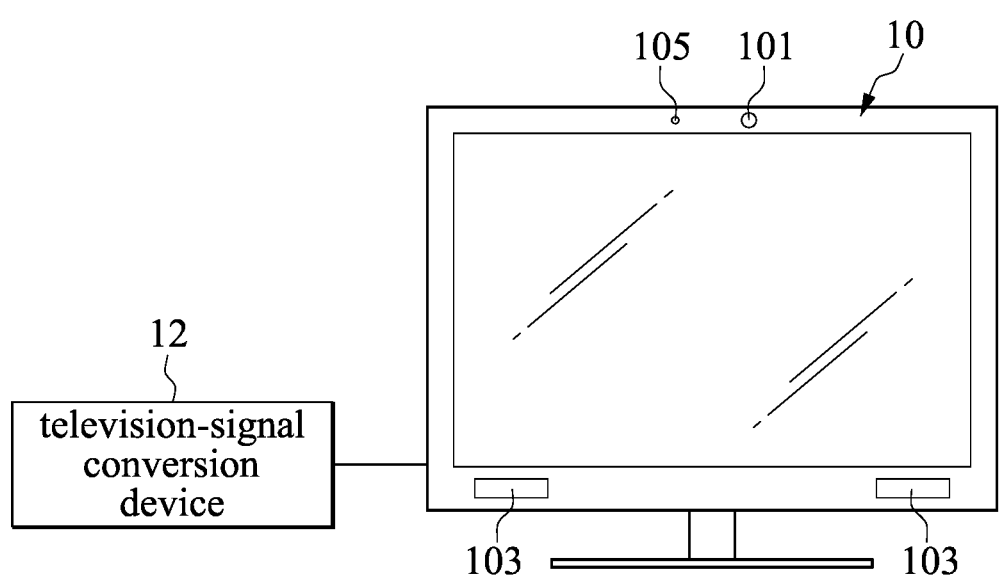
FIG. 1 is a schematic view of a television adapting a method for matching parameters applied to a display device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure relates to a method for matching parameters applied to a display device and a circuit system implementing the method. The display device can be a television and the circuit system can be built into a circuitry used for processing signals in the television, or disposed in a circuit of a device outside of the television. For example, the circuit system can be disposed in a television-signal conversion device which can be a set top box used to conduct analogy-to-digital signal conversion. The circuit system can also be a television chip in the television or the television-signal conversion device.

In addition to operating the display device to display contents, the circuit system controls operations of attachments. Reference is made to FIG. 1, which is a schematic diagram depicting a television adopting the method for matching parameters applied to the display device according to one embodiment of the present disclosure.

A television 10 shown in the diagram includes a display panel, a camera 101, a speaker 103, and a microphone 105. The circuit system can be disposed inside a television-signal conversion device 12 of the television 10, or built into a signal conversion circuit of the display device. The circuit system mainly operates the display panel and the attachments according to related parameters. The display panel and the attachments are driven to operate according to factory default values or preferred parameters.

The circuit system is a parameterizable television chip that is used to operate the television. The method for matching the parameters applied to the display device is to match and combine the parameters according to individual properties of the display device and the attachments. In an aspect of the present disclosure, it is not necessary for an integrated circuit (IC) design company to re-design the television chip since the IC design company can provide the television chips according to the preferences of the manufacturers and any individual.

Figure 2:
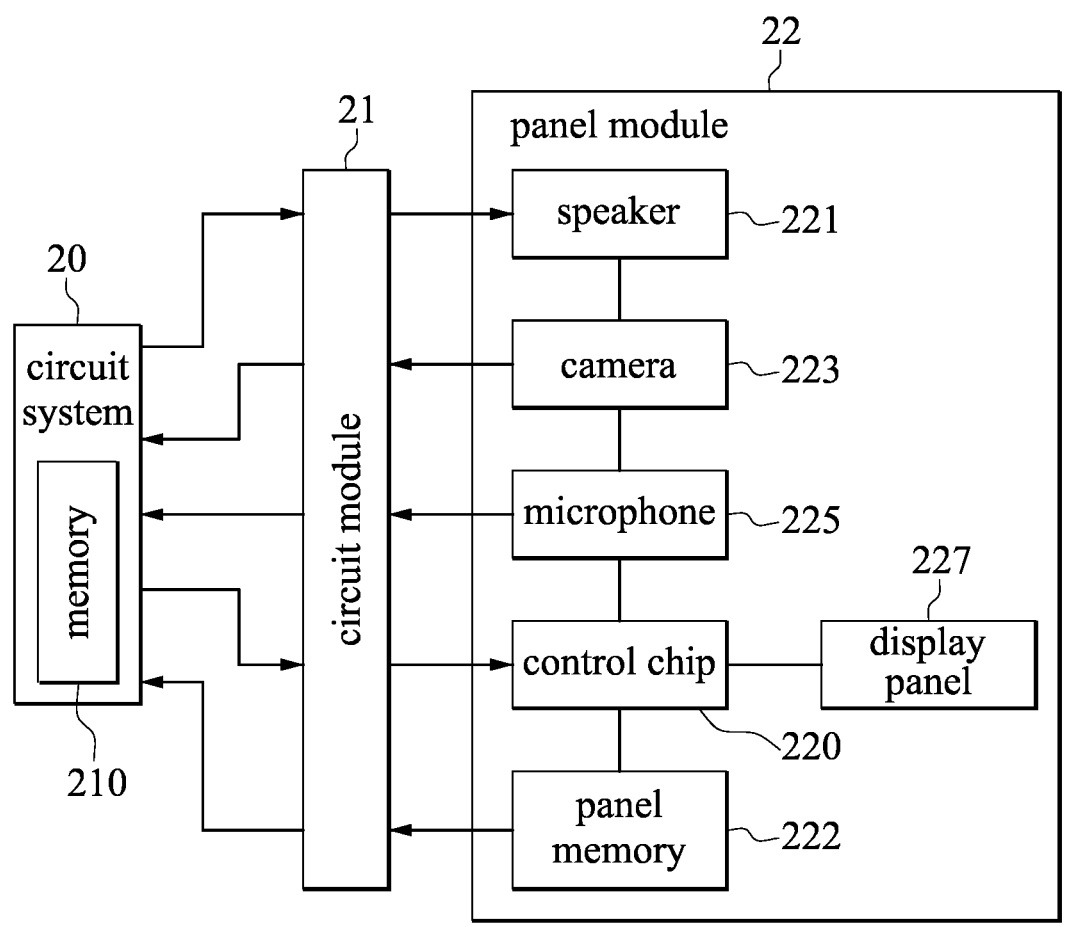
FIG. 2 is a schematic diagram depicting a system performing the method for matching the parameters applied to the display device according to one embodiment of the present disclosure.

FIG. 2 is a schematic diagram depicting the circuit system which operates the method for matching parameters applied to the display device according to one embodiment of the present disclosure. A circuit system 20 as shown in the diagram is connected to a panel module 22 of the display device via a circuit module 21.

According to one embodiment of the present disclosure, the circuit system 20 is such as a system on a chip (SoC). A memory 210 of the circuit system 20 stores parameters applied to the display device. In the beginning, the circuit system 20 reads the factory parameters from a panel memory 222 of the panel module 22. In the method, the parameters stored in the memory 210 are re-matched so as to obtain new parameters which are used for operating the display device. The panel module 22 of the display panel includes a speaker 221, a camera 223, a microphone 225, a display panel 227, and the panel memory 222. Furthermore, a control chip 220 used to control the aforementioned circuit components is also included in the panel module 22. For example, the control chip 220 controls the images outputted by the display panel 227.

According to one embodiment that depicts a connection relationship between the circuit system 20 and the panel module 22, the circuit system 20 supports various lines and communication protocols of the circuit components connected to the panel module 22. The circuit system 20 connects with the panel module 22 via the circuit module 21. The circuit module 21 includes various signal interfaces in compliance with various specifications such as an I2S (inter-IC sound) line used to connect with the speaker 221, a universal serial bus (USB) used to connect with the camera 223, a PDM (pulse density modulation) line used to connect with the microphone 225, and various lines (e.g., Vby1, EPI, LVDS, and miniLVDS) used to connect with various subsystems in a control chip 220. The circuit system 20 connects with the control chip 220 for controlling subsystems of frame rate control (FRC), motion estimation and motion compensation (MEMC) and timing controller (TCON). Further, the circuit system 20 also uses I2C (inter-integrated circuit), SPI (serial peripheral interface) or USB to connect with the panel memory 222 for reading the parameters from the panel memory 222. The circuit system 20 is used to communicate with a panel module 22.

Figure 3:
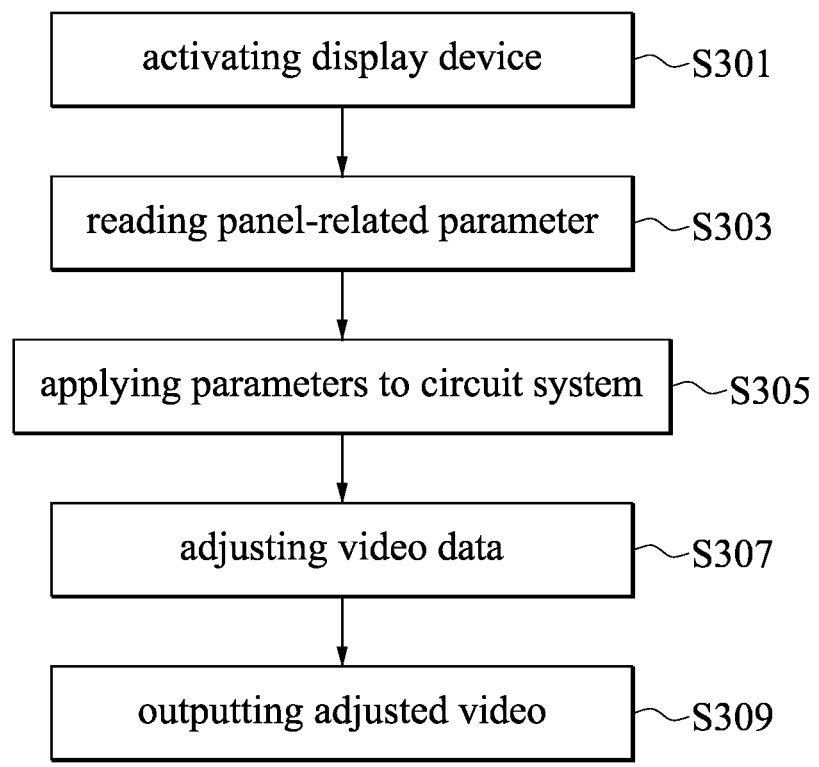
FIG. 3 is a flowchart describing the method for matching the parameters applied to the display device according to one embodiment of the present disclosure.

Reference is made to FIG. 3, which is a flowchart describing a method for matching parameters applied to a display device according to one embodiment of the present disclosure.

A display device is activated (step S301). A circuit system which is built into or external to the display device is also activated especially during an initial setup procedure when the display device is booted up after leaving the factory or shipping. The circuit system connects with a panel module via a specific line of the above-mentioned circuit module and reads related parameters of the panel module (step S303). The circuit system reads parameters from a panel memory, and, for example, the parameters can be one or any combination of video display parameters, camera image parameters, speaker audio parameters, and microphone receiving parameters.

Next, the parameters that are read are configured to be applied to the circuit system (step S305). The circuit system then implements operations such as displaying images, playing audio, video and audio receiving of the panel module. The circuit system allows an operator or a computer sequence to automatically or manually adjust data generated by operating the display device. For example, a video data is adjusted for re-matching parameters according to a demand (step S307). In one embodiment of the present disclosure, the panel module includes a memory such as the aforementioned panel memory. The memory is used to store initial factory parameters when the display device leaves the factory. The initial factory parameters are provided for the circuit system to re-match the parameters that are used to substitute the initial factory parameters. Afterwards, data of an adjusted video and the related attachments are outputted. For example, the matched parameters are applied to the circuit system so as to produce at least one of an adjusted video, a camera image and an audio, and/or to receive the audio with matched audio-receiving parameters.

According to one embodiment of the present disclosure, the video display parameters include one or any combination of display size, resolution, refresh rate, maximum screen brightness, screen saturation and color parameters, screen gamma curve, screen delay, maximum screen supported frequency, high dynamic range, color gamut, maximum chroma, and number of local dimming regions. The camera image parameters include at least one of camera pixels, compression ratio, and refresh rate. The microphone receiving parameters include at least one of microphone quantity, directivity, noise reduction setting, and dynamic range. In an exemplary example, a software process can be used to set up a specific resolution and a refresh rate applied to the display panel based on a resolution and a maximum screen supported frequency supported by the display panel. With a display panel having 4K resolution and 120 Hz refresh rate as an example, the circuit system is configured to output images with 4K resolution and 120 Hz refresh rate. When the display panel only supports FHD (2K) resolution and 60 Hz refresh rate, the circuit system is to output the images with a 2K resolution and a 60 Hz refresh rate.

Figure 4:
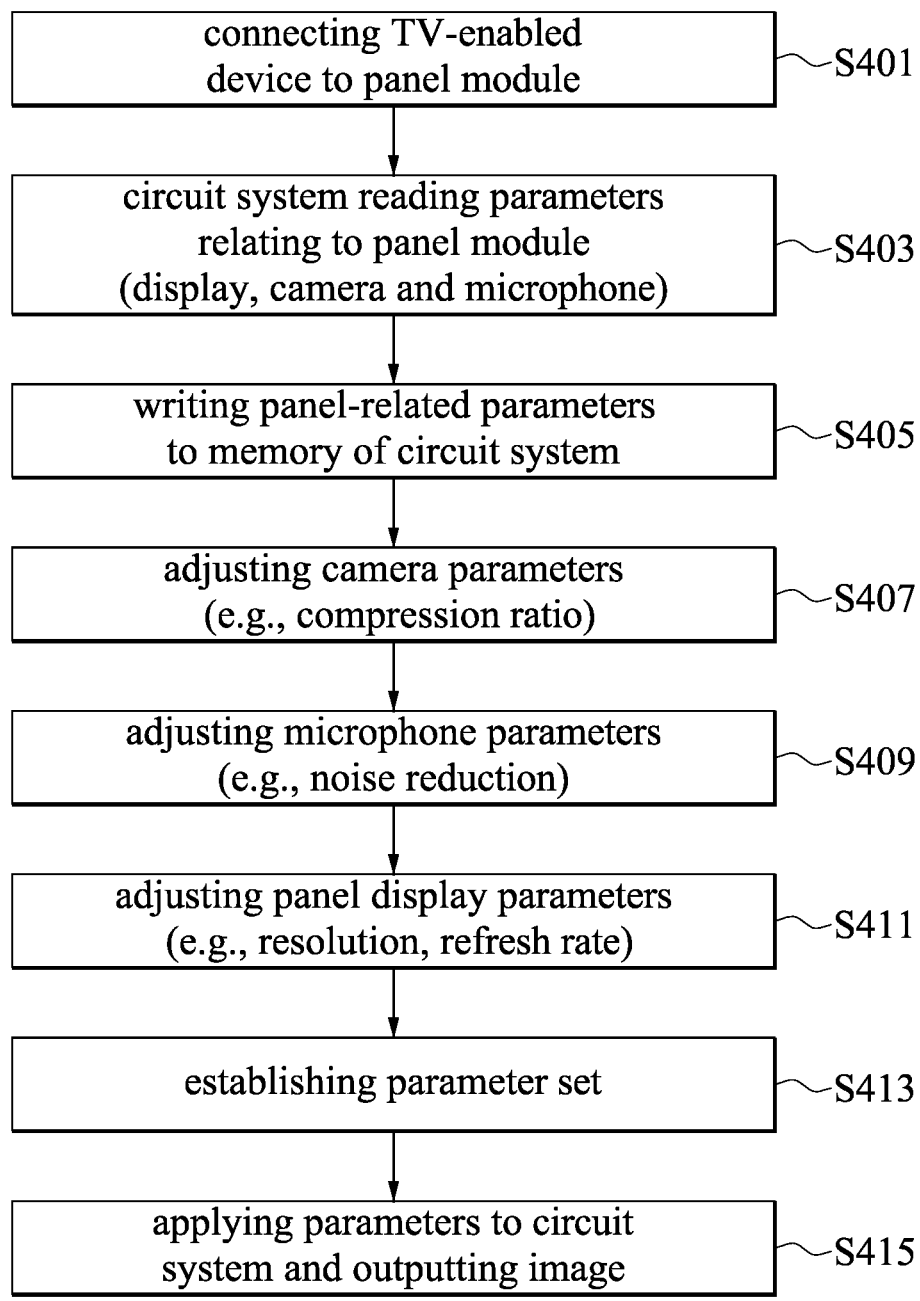
FIG. 4 is another flowchart describing the method for matching the parameters applied to the display device according to another embodiment of the present disclosure.

Reference is made to FIG. 4, which shows a flowchart describing a method for matching parameters applied to a display device according to one embodiment of the present disclosure.

In the beginning, a TV-enabled device such as a built-in circuit module or an external television-signal conversion device connects with a panel module of a display device (step S401). A circuit system is used to read parameters of the panel module (step S403), and write panel-related parameters to a memory of the circuit system (step S405). Next, a software process is used to adjust data outputted from the circuit system, for example, adjust the parameters such as a compression rate of a camera (step S407), adjust the parameters related to noise reduction of a microphone (step S409), and adjust the parameters such as a resolution and a refresh rate of the display panel (step S411).

The parameters applicable to the display device are not limited to the above example. In the method, the parameters relating to display size, resolution, maximum screen brightness, screen saturation and color parameters, screen gamma curve, screen delay, maximum screen supported frequency, high dynamic range (HDR), color gamut, maximum chroma and number of local dimming regions applicable to the display panel are re-matched. It should be noted that the local dimming regions are the regions divided from a display panel, and the related parameters such as brightness with respect to each of the regions can be adjusted individually. Further, the parameters of the attachments are such as pixels and a refresh rate of a camera. Thus, the smoothness of a video can be maintained by dynamically adjusting a compression ratio according to the parameters of pixels and a network bandwidth. The parameters such as microphone quantity, directivity and dynamic range of each of the microphones can be adjusted, and noise/reverb reduction and a beamforming algorithm can be selected based on the microphone quantity for providing a good sound quality to a user.

Afterwards, the adjusted data is used to re-build a parameter set (step S413), and the parameter set is stored to a memory. The re-matched parameters are then applied to operate the circuit system so as to operate the panel module for outputting images and data of the attachments based on the above adjustments (step S415).

Figure 5:
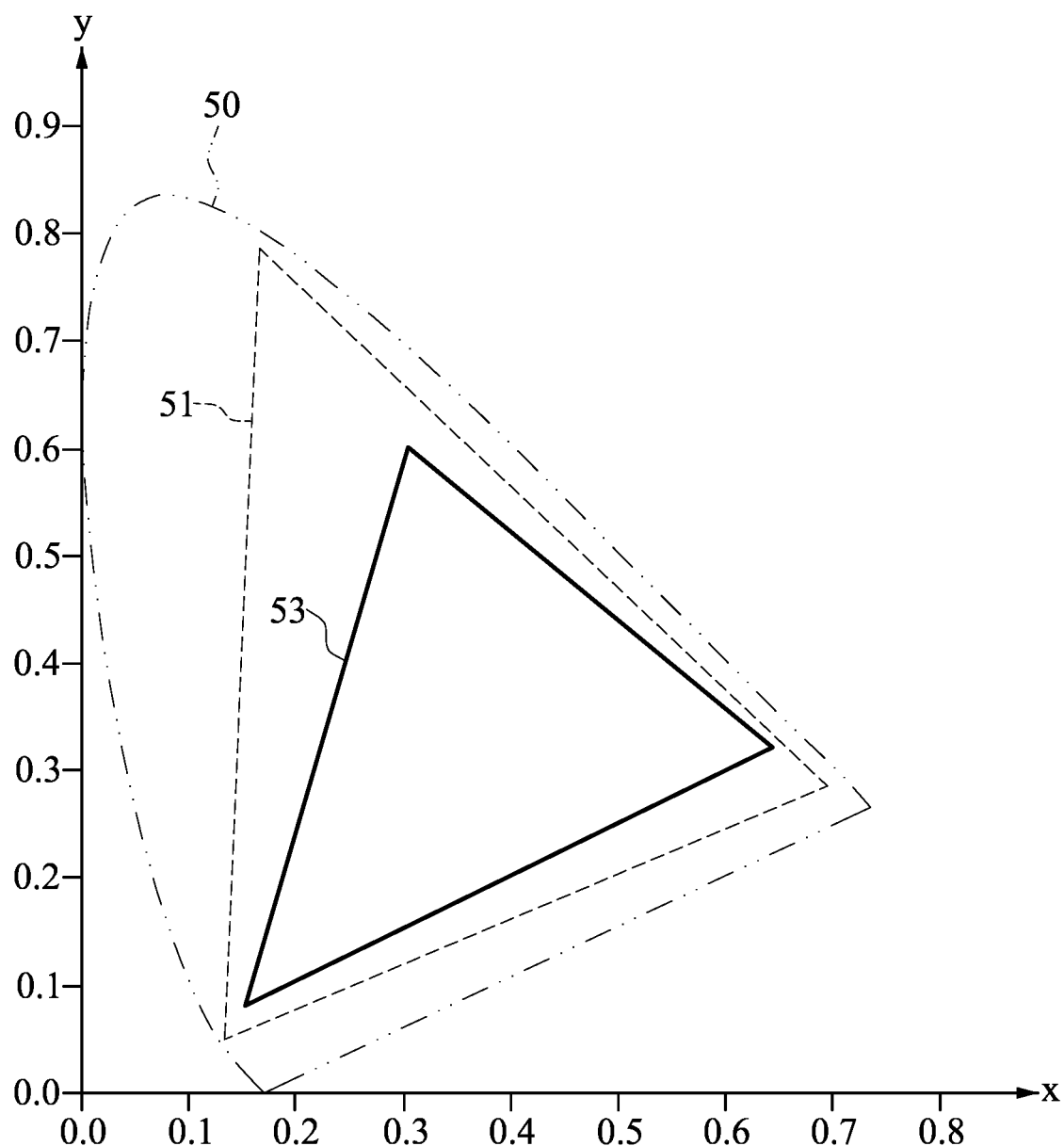
FIG. 5 is a schematic view of a chromatic diagram which is used to match display color parameters.

FIG. 5 shows a chromatic diagram which is used to match color parameters of a display. In the chromatic diagram, a chromatic range 50 based on red (R), green (G) and blue (B) color gamut is shown. The exemplary chromatic range 50 includes an ITU-R BT.2020 color gamut 51 and an ITU-R BT.709 color gamut 53. In one embodiment of the present disclosure, when the display parameters are matched, a software process is used to set up a range for image quality adjustment according to one or any combination of display panel parameters such as maximum screen brightness, screen saturation and color parameters, screen gamma curve, screen delay, high dynamic range, color gamut and maximum chroma. When the display panel supports the ITU-R BT.2020 color gamut 51, the red, green and blue color gamut can reach a bigger range than the ITU-R BT.709 color gamut 53.

In conclusion, according to the abovementioned embodiments related to the method for matching parameters applied to a display device and the circuit system, the display device can be a television, and the parameterizable circuit system can be disposed in a television-signal conversion device that is connected with the television, or a circuit built into the television. Through the method and the circuit system, new parameters can be re-matched effectively by adjusting the related data. Therefore, the parameters applied to the circuit system can be adjusted according to attributes of the display panel, and the time spent on development of a chip can be effectively shortened, further, the operating parameters can be adaptively matched based on customer demands. Furthermore, the images that meet requirements of a consumer, e.g., image with best quality, can be obtained, and the consumer only needs to purchase the display without needing to buy any additional attachment.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for matching parameters applied to a display device, comprising:
   after activating the display device, connecting a circuit system of the display device to a panel module of the display device;
   reading, by the circuit system, parameters from a panel memory of the panel module;
   applying the parameters to the display device by the circuit system;
   adjusting data being outputted by the circuit system for re-matching the parameters when the circuit system operates the display device; and generating re-matched parameters that are applied for operating the panel module of the display device.

2. The method according to claim 1, wherein the display device is a television, the circuit system is disposed in a television-signal conversion device that is connected with the television, and the method is applied to a parameterizable circuit system.

3. The method according to claim 1, wherein the parameters read from the panel memory include one or any combination of video display parameters, camera image parameters, speaker audio parameters and microphone receiving parameters.

4. The method according to claim 3, wherein the video display parameters include one or any combination of display size, resolution, refresh rate, maximum screen brightness, screen saturation and color parameters, screen gamma curve, screen delay, maximum screen supported frequency, high dynamic range, color gamut, maximum chroma and number of local dimming regions.

5. The method according to claim 4, wherein the display device is a television, the circuit system is disposed in a television-signal conversion device that is connected with the television, and the method is applied to a parameterizable circuit system.

6. The method according to claim 3, wherein the camera image parameters include at least one of camera pixels, compression ratio and refresh rate; and the microphone receiving parameters include at least one of microphone quantity, directivity, noise reduction setting and dynamic range.

7. The method according to claim 6, wherein the display device is a television, the circuit system is disposed in a television-signal conversion device that is connected with the television, and the method is applied to a parameterizable circuit system.

8. The method according to claim 3, wherein the re-matched parameters are applied to the circuit system so as to produce at least one of an adjusted video, a camera image and an audio and/or to receive the audio with matched audio-receiving parameters.

9. The method according to claim 8, wherein the display device is a television, the circuit system is disposed in a television-signal conversion device that is connected with the television, and the method is applied to a parameterizable circuit system.

10. The method according to claim 9, wherein the panel memory stores initial factory parameters of the display device, and the matched parameters made by the circuit system replace the initial factory parameters.

11. A circuit system, performing a method for matching parameters applied to a display device, wherein the method comprises:
    after activating the display device, connecting the circuit system of the display device to a panel module of the display device;
    reading, by the circuit system, parameters from a panel memory of the panel module;
    applying the parameters to the display device by the circuit system;
    adjusting data being outputted by the circuit system for re-matching the parameters when the circuit system operates the display device; and
    generating re-matched parameters that are applied for operating the panel module of the display device.

12. The circuit system according to claim 11, wherein the circuit system is disposed inside a television-signal conversion device, the television-signal conversion device is connected with the display device, and the circuit system is built in the television.

13. The circuit system according to claim 11, wherein the parameters read from the panel memory include one or any combination of video display parameters, camera image parameters, speaker audio parameters and microphone receiving parameters.

14. The circuit system according to claim 13, wherein the video display parameters include one or any combination of display size, resolution, refresh rate, maximum screen brightness, screen saturation and color parameters, screen gamma curve, screen delay, maximum screen supported frequency, high dynamic range, color gamut, maximum chroma and number of local dimming regions.

15. The circuit system according to claim 14, wherein the circuit system is disposed inside a television-signal conversion device, the television-signal conversion device connects with the display device, and the circuit system is built in the television.

16. The circuit system according to claim 13, wherein the camera image parameters include at least one of camera pixels, compression ratio and refresh rate; and the microphone receiving parameters include at least one of microphone quantity, directivity, noise reduction setting and dynamic range.

17. The circuit system according to claim 13, wherein the re-matched parameters are applied to the circuit system so as to produce at least one of an adjusted video, a camera image and an audio and/or to receive the audio with matched audio-receiving parameters.

18. The circuit system according to claim 17, wherein the circuit system is disposed inside a television-signal conversion device, the television-signal conversion device connects with the display device, and the circuit system is built in the television.

19. The circuit system according to claim 18, wherein the display device is a television, and the circuit system is a parameterizable television chip used to operate the television.

20. The circuit system according to claim 18, wherein the panel memory stores initial factory parameters of the display device, and the matched parameters made by the circuit system replace the initial factory parameters.

* * * * *